(12) United States Patent
Park et al.

(10) Patent No.: US 10,408,668 B2
(45) Date of Patent: Sep. 10, 2019

(54) APPARATUS OF ESTIMATING VEHICLE WEIGHT AND METHOD USING THE SAME

(71) Applicants: HYUNDAI MOTOR COMPANY, Seoul (KR); KIA MOTORS CORPORATION, Seoul (KR)

(72) Inventors: Seong Ik Park, Seoul (KR); Soo Bang Lee, Suwon-si (KR); Leehyoung Cho, Suwon-si (KR); Gi Young Kwon, Seoul (KR); Sang Joon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 212 days.

(21) Appl. No.: 15/611,292

(22) Filed: Jun. 1, 2017

(65) Prior Publication Data
US 2018/0128672 A1 May 10, 2018

(30) Foreign Application Priority Data
Nov. 7, 2016 (KR) .................. 10-2016-0147727

(51) Int. Cl.
G01G 19/02 (2006.01)
F16H 63/40 (2006.01)
(Continued)

(52) U.S. Cl.
CPC ........... *G01G 19/022* (2013.01); *F16H 59/52* (2013.01); *F16H 63/40* (2013.01); *G01G 19/03* (2013.01);
(Continued)

(58) Field of Classification Search
CPC ..... B60Y 2200/92; F16H 59/14; F16H 59/48; F16H 59/52; F16H 63/40; G01G 19/022; G01G 19/03; Y10S 903/903
(Continued)

(56) References Cited

U.S. PATENT DOCUMENTS

2004/0167705 A1* 8/2004 Lingman ................. B60T 8/172
701/124
2005/0010356 A1* 1/2005 Ishiguro .................. F16H 59/52
701/124
(Continued)

FOREIGN PATENT DOCUMENTS

JP 2012-078134 4/2012
JP 2015-059901 3/2015
(Continued)

*Primary Examiner* — John H Le
(74) *Attorney, Agent, or Firm* — Brinks Gilson & Lione

(57) ABSTRACT

An apparatus of estimating a vehicle weight may include: an acceleration detector detecting a longitudinal direction acceleration of the vehicle; a data detector detecting state data to estimate the vehicle weight; an engine clutch disposed between an engine and a drive motor and selectively connecting the engine to the drive motor; an integrated starter-generator for starting the engine and generating electric energy; and a vehicle controller calculating a basic vehicle weight based on an engine torque, a motor torque and the longitudinal direction acceleration detected by the acceleration detector. The vehicle controller estimates a final vehicle weight based on the basic vehicle weight and a predetermined weight when an estimating entrance condition is satisfied from the state data.

16 Claims, 6 Drawing Sheets

(51) Int. Cl.
*G01G 19/03* (2006.01)
*F16H 59/52* (2006.01)
F16H 59/14 (2006.01)
F16H 59/48 (2006.01)

(52) U.S. Cl.
CPC .......... *B60Y 2200/92* (2013.01); *F16H 59/14* (2013.01); *F16H 59/48* (2013.01); *Y10S 903/903* (2013.01)

(58) Field of Classification Search
USPC ................ 702/96, 141, 142, 173, 174, 175; 701/124; 73/146
See application file for complete search history.

(56) References Cited

U.S. PATENT DOCUMENTS

2005/0235744 A1* 10/2005 Ogawa ................. B60C 23/001
  73/146
2013/0253814 A1*  9/2013 Wirthlin ................ G01G 19/02
  701/124
2014/0365171 A1* 12/2014 Asano .................. B60W 40/13
  702/174

FOREIGN PATENT DOCUMENTS

| JP | 2015-123822 A | 7/2015 |
| KR | 10-0828778 B | 5/2008 |
| KR | 10-1350240 B | 1/2014 |

\* cited by examiner

APPARATUS OF ESTIMATING VEHICLE WEIGHT AND METHOD USING THE SAME

CROSS-REFERENCE TO RELATED APPLICATION

This application claims priority to and the benefit of Korean Patent Application No. 10-2016-0147727, filed Nov. 7, 2016, the entire contents of which are incorporated herein by reference.

FIELD

The present disclosure relates to an apparatus and a method of estimating a vehicle weight.

BACKGROUND

The statements in this section merely provide background information related to the present disclosure and may not constitute prior art.

Recently, global environmental contamination has become a serious issue, and thus use of clean energy is becoming more and more important day by day. Particularly, air pollution in major cities is becoming more severe day by day, and exhaust gas of a vehicle is one of main causes of the air pollution.

In order to solve the problem of exhaust gas and to reduce fuel consumption, an environmentally-friendly vehicle such as a hybrid vehicle and an electric vehicle has been developed.

The hybrid vehicle has a power generation device that includes an engine and a motor, and is driven by power that is generated by a combustion action of the engine and also power that is generated by a rotation of a motor using electrical energy that is stored in a battery.

In the hybrid vehicle, a transmission implementing a Transmission Mounted Electric Device method (TMED) that connects a driving motor and a transmission is generally used.

In the hybrid vehicle, as a device to transfer power of the engine to a driving shaft, an engine clutch is mounted between the engine and the driving motor.

The hybrid vehicle provides an Electric Vehicle (EV) mode that provides running of the vehicle with a torque of only a driving motor and a Hybrid Electric Vehicle (HEV) mode that provides running of the vehicle with the sum of an engine torque and a driving motor torque according to whether coupling of the engine clutch occurs.

When a trailer is mounted in the hybrid vehicle, an inertial load of the vehicle is increased and it is difficult to manage SOC (State Of Charge) of a battery. Therefore, a driving performance, a climbing performance and fuel consumption are deteriorated.

Accordingly, whether the trailer is mounted or not is one of important factors to precisely control the vehicle.

According to the conventional art, a dedicated cable of the trailer has been used to determine that the trailer is mounted or not. However, if a driver does not mount the dedicated cable of the trailer or use it, it is difficult to exactly determine whether the trailer is mounted.

SUMMARY

The present disclosure provides an apparatus of estimating a vehicle weight and a method that can determine whether a trailer is mounted by estimating a vehicle weight.

Further, the present disclosure provides an apparatus of estimating a vehicle weight and a method that can estimate the vehicle weight based on state data of the vehicle.

In one form of the present disclosure, an apparatus of estimating a vehicle weight may include: an acceleration detector configured to detect a longitudinal direction acceleration of the vehicle; a data detector configured to detect state data for estimating the vehicle weight; an engine clutch disposed between an engine and a drive motor and configured to selectively connect the engine to the drive motor; an integrated starter-generator configured to start the engine and to generate electric energy operated; and a vehicle controller configured to calculate a basic vehicle weight based on an engine torque, a motor torque, and the longitudinal direction acceleration detected by the acceleration detector, and configured to estimate a final vehicle weight based on the basic vehicle weight and a predetermined weight when an estimating entrance condition is satisfied from the state data.

The vehicle controller include may include a condition checking unit configured to determine whether the estimating entrance condition based on the state data, and to generate an estimating confirmation signal when the estimating entrance condition is satisfied; a generating unit configured to calculate the basic vehicle weight based on the engine torque, the motor torque, and the longitudinal direction acceleration when the estimating confirmation signal is transmitted from the condition checking unit; an update checking unit configured to determine whether an update condition based on a calculation time, a vehicle speed variation and a change of gear shifting, and to generate an update confirmation signal when the update condition is satisfied; and an estimating unit configured to calculate a final vehicle weight based on the basic vehicle weight and a predetermined weight when the update confirmation signal is transmitted from the update checking unit.

The condition checking unit may receive a position value of an acceleration pedal, a position value of a brake pedal, a shift-stage from the data detector, check a braking amount dependent on the position value of the brake pedal, checks a road slope dependent on the longitudinal direction acceleration, and determine whether the estimating entrance condition is satisfied based on the position value of acceleration pedal, the braking amount, the road slope, a shift class, a control phase of the engine clutch.

The generating unit may calculate the basic vehicle weight based on the engine torque, the motor torque, the longitudinal direction acceleration, tire dynamic radius, a shift efficiency, a clutch coefficient with respect to a state of the engine clutch, an engine friction torque, a pulley ratio between the engine and the integrated starter-generator, a vehicle speed, a generation torque of the integrated starter-generator and a driving load coefficient.

The generating unit calculates the basic vehicle weight from an equation 1 of $$m = \frac{\int_{t0}^{t1} \left[ \frac{\eta_{TM}}{r_{tire}} (\delta_{E/C}(\tau_{eng}^{lod} - \tau_{eng}^{fr} + \gamma \tau_{HSG}) + \tau_{Mot}^{BeAj}) - (f_0 + f_1 v + f_2 v^2) \right] dt}{\int_{t0}^{t1} G(t) dt},$$

where the m is the basic vehicle weight, the $\eta_{TM}$ is the shift efficiency, the $r_{tire}$ is the dynamic radius of the tire, the $\delta_{EC}$ is the clutch coefficient according to the state of the engine clutch 120, the $\tau_{eng}^{led}$ is the engine torque, the $\tau_{eng}^{fr}$ is the engine friction torque, the $\gamma$ is the pulley ratio between the engine 110 and the HSG 115, the $\tau_{HSG}$ is the generation torque of the HSG 115, the $\tau_{Max}^{BeAj}$ is the motor torque, the $f_0$, $f_1$, $f_2$ are the driving load coefficients, the v is the vehicle speed and the G(t) is the longitudinal direction acceleration.

$$m = \frac{\int_{t0}^{r1} \left[ \frac{\eta_{TM}}{r_{tire}} \left( \delta_{E/C} (\tau_{eng}^{lad} - \tau_{eng}^{fr} + \gamma t_{HSG}) + \tau_{Mot}^{BeAj} \right) - (f_0 + f_1 v + f_2 v^2) \right] dt}{\int_{t0}^{r1} G(t) dt}$$

The estimating unit may determine whether the basic vehicle weight is equal or less than a predetermined weight, and set the final vehicle weight as the predetermined weight when the basic vehicle weight is equal or less than the predetermined weight.

The estimating unit may check the estimating variation weight which shows a difference between a previously calculated vehicle weight and the current basic vehicle weight, when the estimating variation weight is greater than a reference variation weight, calculates the final vehicle weight based on the previously calculated vehicle weight and the reference variation weight.

The vehicle controller may further include a level determiner determining a towing level based on the final vehicle weight.

The level determiner may determine the towing level based on the final vehicle weight through a plurality of relay.

In one form of the present disclosure, a method of estimating a vehicle weight may include determining, by a condition checking unit, whether an estimating entrance condition based on state data; calculating, by a generating unit, a basic vehicle weight based on an engine torque, a motor torque and a longitudinal direction acceleration when the estimating entrance condition is satisfied; determining, by an update checking unit, whether an update condition is satisfied based on a calculation time, vehicle speed variation and a change of gear shifting; calculating, by an estimating unit, a final vehicle weight based on the basic vehicle weight and a predetermined weight when the update condition is satisfied; and determining, by a level determiner, a towing level based on the final vehicle weight.

In one exemplary form of the present disclosure, since it is possible to determine whether the trailer is mounted by estimating vehicle weight, the vehicle can be controlled based on a trailer weight when the trailer is mounted in the vehicle, and thus drivability is improved.

Further, since the vehicle is controlled by estimating the vehicle weight based on the state date of the vehicle, driving performance can be stably obtained and fuel consumption can be improved.

Effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
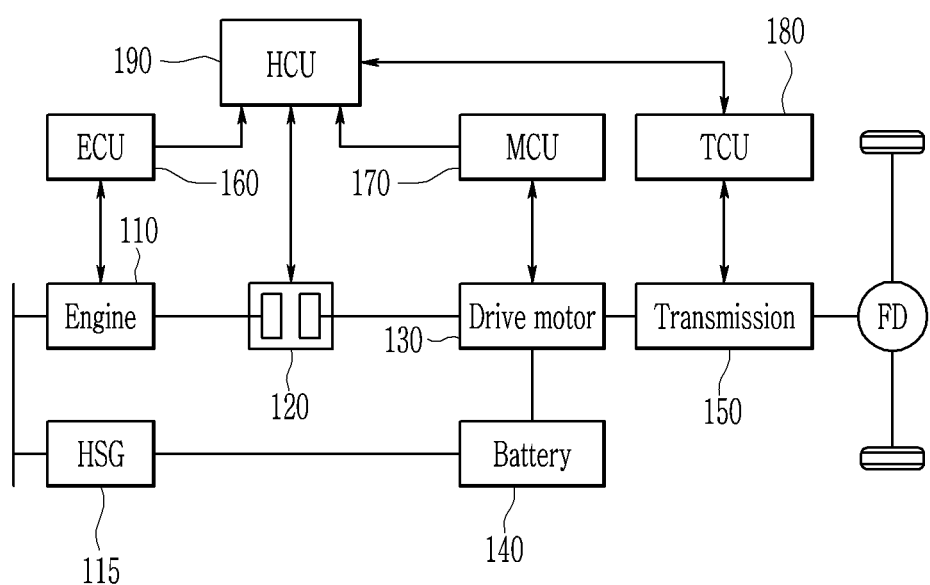
FIG. 1 is a block diagram illustrating an apparatus of estimating a vehicle weight.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in the description of the present disclosure, the detailed description of related well-known configurations and functions is not provided, when it is determined as unnecessarily making the scope of the present disclosure unclear. Further, the terminologies to be described below are ones defined in consideration of their function in the present disclosure and may be changed by the intention of a user or an operator or a custom. Therefore, their definition should be determined on the basis of the description of the present disclosure.

Further, in the following exemplary forms, the terminologies are appropriately changed, combined, or divided so that those skilled in the art can clearly understand them, in order to efficiently explain the main technical characteristics of the present disclosure, but the present disclosure is not limited thereto.

Hereinafter, an exemplary form of the present disclosure will be described in detail with reference to accompanying drawings.

FIG. 1 is a block diagram illustrating an apparatus of estimating a vehicle weight in one exemplary form of the present disclosure.

Referring to FIG. 1, a hybrid vehicle applied with an apparatus of estimating a vehicle weight includes an engine 110, a hybrid integrated starter and generator 115 (hereinafter, will be referred to HSG), an engine clutch 120, a drive motor 130, a battery 140, a transmission 150, an engine controller 160 (hereinafter, will be referred to ECU), a motor controller 170 (hereinafter, will be referred to MCU), a transmission controller 180 (hereinafter, will be referred to TCU), and a hybrid controller 190 (hereinafter, will be referred to HCU).

The engine 110 generates driving power by burning fuel. That is, the engine 110 may use various engines such as a gasoline engine using conventional fossil fuel or a diesel engine. The driving power generated from the engine 110 is transmitted to the transmission 150.

The HSG 115 starts up the engine 110 and functions as a generator while the engine 110 is started up to generate electrical energy.

The engine clutch 120 is disposed between the engine 110 and the drive motor 130, and is operated according to the control of the HCU 190 to switch power delivery between the engine 110 and the drive motor 130. That is, the engine clutch 120 connects or intercepts power between the engine 110 and the drive motor 130 according to switching of an EV mode and an HEV mode.

The drive motor 130 may be operated by a three-phase AC voltage applied from the battery 140, thereby generating the torque. The drive motor 130 is operated as a generator upon coast down running or regenerative braking to supply a regenerative energy to the battery 140.

The battery 140 is formed with a plurality of unit cells, and a high voltage for providing a driving voltage to the drive motor is stored in the battery 140. For example, the battery 140 charges voltage of approximately DC 400V to 450V. The battery 140 supplies driving voltage to the drive motor 130 at EV mode or HEV mode, and is charged with voltage generated from the drive motor 130 and the HSG 115 during regenerative braking.

The sum of an output torque of the drive motor 130 and an output torque of the engine 110 that is determined according to coupling and release of the engine clutch 120 is supplied as an input torque, and a random transmission level is selected based on a vehicle speed and a driving condition and thus the transmission 150 outputs a driving torque to a driving wheel to maintain driving.

The transmission 150 may be a DCT (dual clutch transmission). The DCT has efficiency of a manual transmission and convenience of an automatic transmission by using two clutches.

The ECU 160 is connected to the HCU 190 through a network, and by interlocking with the HCU 190, the ECU 160 controls general operations of the engine 110 according to an operation state of the engine 110 such as a request torque signal of a driver, a coolant temperature, and a rotation speed of the engine, an opening of a throttle valve, an intake air amount, an oxygen amount, and an engine torque. The ECU 160 provides an operation state of the engine 110 to the HCU 190.

The MCU 170 controls driving and torque of the drive motor 130 according to the control of the HCU 190, and stores electricity that is generated in the drive motor 130 in the battery 140 during regenerative braking. The MCU 170 controls an overall operation of the drive motor according to a desire torque of a driver, a driving mode of the vehicle and the SOC(State Of Charge) of the battery 140.

The TCU 180 controls a shift ratio according to each output torque of the ECU 160 and the MCU 170 and determines a regenerative braking amount, i.e., controls general operations of the transmission 150. The TCU 180 provides an operation state of the transmission 150 to the HCU 190.

The HCU 190 is a superordinate controller that sets a hybrid running mode and that controls general operations of the environmentally-friendly vehicle. The HCU 190 integrally controls subordinate controllers that are connected through a Controller Area Network (CAN) communication network, collects and analyzes information of each subordinate controller, and executes cooperation control to control output torques of the engine 110 and the drive motor 130.

General operations of the hybrid vehicle are same as conventional hybrid vehicle such that detailed description will be omitted.

Meanwhile, in FIG. 1, the hybrid vehicle including the engine 110 and the drive motor 130 is illustrated, but the hybrid vehicle can be applied to an environmentally-friendly vehicle like an electric vehicle, a plug-in hybrid vehicle, etc.

Figure 2:
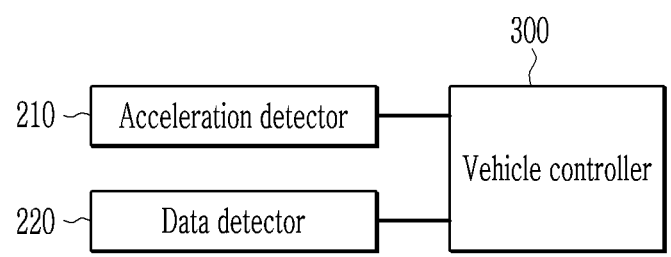
FIG. 2 is a schematic block diagram illustrating an apparatus of estimating a vehicle weight.

FIG. 2 is a schematic block diagram illustrating an apparatus of estimating a vehicle weight in an exemplary form of the present disclosure. In the method of estimating a vehicle weight in one form of the present invention to be described below, some processes may be performed by the ECU 160 and MCU 170, and some other processes may be performed by the HCU 190. Here, since the ECU 160, the MCU 170, the TCU 180 and the HCU 190 may be described as one vehicle controller 300, and the ECU 160, MCU 170, TCU 180 and HCU 190 will be referred to as the vehicle controller 300.

Referring to FIG. 2, an apparatus of estimating a vehicle weight includes an acceleration detector 210, a data detector 220, and a vehicle controller 300.

The acceleration detector 210 detects a longitudinal direction acceleration of the vehicle. The longitudinal direction acceleration detected by the acceleration detector 210 is transmitted to the vehicle controller 300. The acceleration detector 210 may regularly detect the longitudinal direction acceleration, or irregularly detect the longitudinal direction acceleration by control of the vehicle controller 300.

The data detector 220 detects state data showing a vehicle state for estimating the vehicle weight. The state data may include a vehicle speed, a position value of an acceleration pedal, a position value of a brake pedal, a shift-stage of the transmission 150, an engine torque and a motor torque.

The position value of the accelerator pedal corresponds to a pressed degree of the accelerator pedal, and the position value of the brake pedal corresponds to a pressed degree of the brake pedal. When the pedal is fully pressed, the position value of the pedal may be 100%, and when the pedal is not pressed, the position value of the pedal may be 0%.

The data detector 220 regularly or irregularly detects the state data by control of the vehicle controller 300.

The vehicle controller 300 determines whether an estimating entrance condition is satisfied based on the state data. The vehicle controller 300 calculates a basic vehicle weight by using the engine torque, the motor torque and the longitudinal direction acceleration when the estimating entrance condition is satisfied. The vehicle controller 300 calculates a final vehicle weight by using the basic vehicle weight and a predetermined weight.

The vehicle controller 300 determines a towing level in accordance with a trailer mounted in the vehicle based on the final vehicle weight. The vehicle controller 300 may control the SOC of the battery according to the towing level. For example, the vehicle controller 300 changes a transition timing between the EV mode and the HEV mode as the towing level is high such that it is possible to increase opportunity of charging the battery through the driving torque of the engine 110. Further, the vehicle controller 300 controls a charging timing of the battery to be advanced as the towing level becomes high such that SOC of the batter is not rapidly decreased.

An operation of the vehicle controller 300 will be described in detail with reference to FIG. 3.

To this end, the vehicle controller 300 may be implemented by one or more processors operated by a predetermined program, and the predetermined program may be programmed to perform each step of a method of estimating a vehicle weight in one form of the present disclosure.

Figure 3:
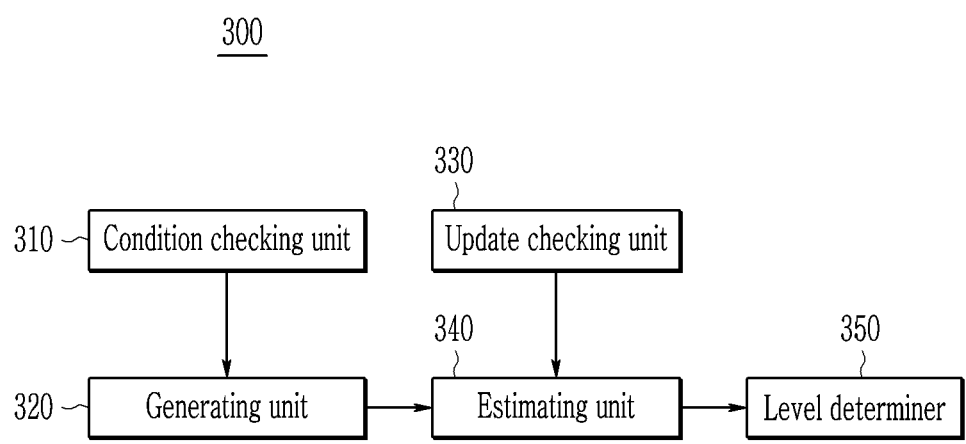
FIG. 3 is a block diagram illustrating a vehicle controller of an apparatus of estimating a vehicle weight.

FIG. 3 is a block diagram illustrating a vehicle controller of an apparatus of estimating a vehicle weight in one exemplary form of the present disclosure.

Referring to FIG. 3, the vehicle controller 300 includes a condition checking unit 310, a generating unit 320, an update checking unit 330, an estimating unit 340, and a level determiner 350.

The condition checking unit 310 determines whether the estimating entrance condition for estimating the vehicle weight is satisfied based on the state data. In detail, the condition checking unit 310 receives the state data from the data detector 220, checks the position value of the acceleration pedal, the position value of the brake pedal and the shift-stage included in the state data, and determines whether the estimating entrance condition is satisfied based on the position value of acceleration pedal, the position value of the brake pedal, the shift-stage, the shift class, and the control phase of the engine clutch 120.

The shift class corresponds to a gear shift type in the transmission 150, and may include a power on down-shift and a power on up-shift, etc. The control phase of the engine clutch 120 indicates a control type of the engine clutch 120, and may include a slip control and a speed control, etc.

The condition checking unit 310 generates an estimating confirmation signal when the estimating entrance condition is satisfied. The condition checking unit 310 transmits the estimating confirmation signal to the generating unit 320.

The generating unit 320 may calculate the basic vehicle weight based on the engine torque, the motor torque, and the longitudinal direction acceleration. In detail, the generating unit 320 calculates the basic vehicle weight by using the engine torque, the motor torque, the longitudinal direction acceleration, a dynamic radius of a tire, a shift efficiency, a clutch coefficient according to a state of the engine clutch 120, an engine friction torque, a pulley ratio between the engine 110 and the HSG 115, a vehicle speed, a generation torque of the HSG 115, and a driving load coefficient when the estimating confirmation signal is transmitted from the condition checking unit 310.

Here, the clutch coefficient may be a predetermined coefficient according to open, slip or lock of the engine clutch 120. The driving load coefficient may be a predetermined value according to a kind of the vehicle. The shift efficiency may be a predetermined efficiency according to the shift-stage. The dynamic radius of the tire may be calculated from pressure of the tire, and a calculation method of the dynamic radius of the tire is well known in the art, thus detailed description will be omitted. The driving load coefficient may be determined from experiments and stored in the vehicle controller as a map data format.

The update checking unit 330 determines whether the basic vehicle weight calculated by the generating unit 320 is updated. In detail, the update checking unit 330 determines whether the update condition is satisfied based on a calculation time, a vehicle speed variation, and a change of gear shift in the transmission.

The calculation time means a time from a time point when the previous final vehicle weight is calculated to a time point when the current basic vehicle weight is calculated. The vehicle speed variation is a difference between the vehicle speed when the previous final vehicle weight is calculated and the vehicle speed when the current basic vehicle weight is calculated.

The update checking unit 330 generates an update confirmation signal and transmits the update confirmation signal to the estimating unit 340 when the update condition is satisfied.

The estimating unit 340 calculates the final vehicle weight by using the basic vehicle weight and a predetermined weight. In detail, the estimating unit 340 calculates the final vehicle weight by using the basic vehicle weight, the predetermined weight, and an estimating variation weight when the update confirmation signal is transmitted from the update checking unit 330. The estimating unit 340 determines whether the basic vehicle weight is less than the predetermined weight. The predetermined weight may be a weight of the vehicle including a plurality of parts and a vehicle body, and may be set according to vehicle model. The estimating unit 340 sets the predetermined weight as the final vehicle weight when the basic vehicle weight is equal or less than the predetermined weight.

The estimating unit 340 checks the estimating variation weight which shows a difference between the previously calculated vehicle weight and the current basic vehicle weight. The previously calculated vehicle weight may be the final vehicle weight previously calculated before the basic vehicle weight is calculated. If the previously calculated vehicle weight does not exist, the predetermined weight may be set as the previously calculated vehicle weight.

The estimating unit 340 calculates the final vehicle weight by using the previously calculated vehicle weight and the reference variation weight when the estimating variation weight is greater than a reference variation weight. The reference variation weight may mean a reference value which the vehicle weight is maximally varied since the vehicle weight is not rapidly varied.

Figure 4:
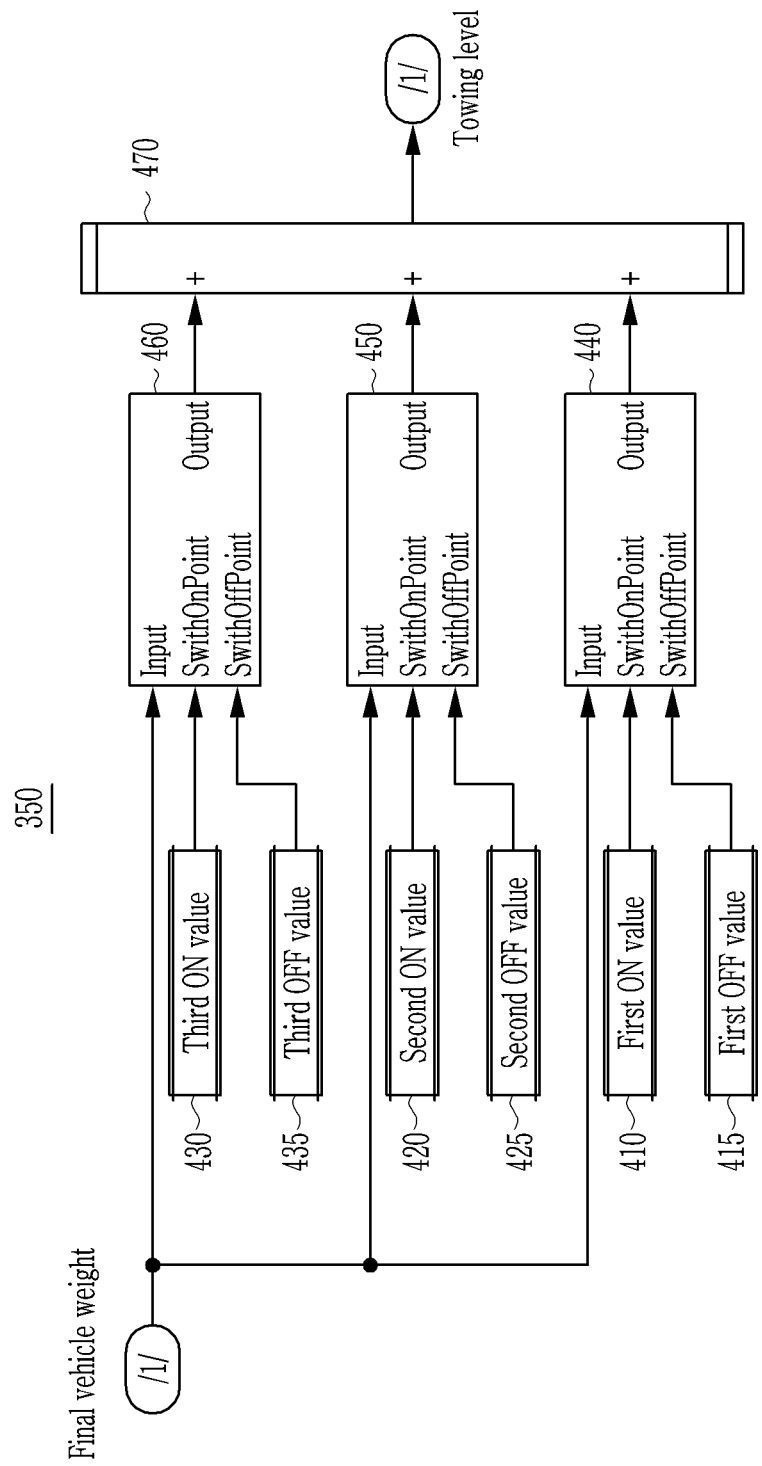
FIG. 4 is a drawing illustrating a level determiner of an apparatus of estimating a vehicle weight.

The level determiner 350 determines a towing level according to the final vehicle weight. As shown in FIG. 4, the level determiner 350 includes a first relay 440 to a third relay 460 and calculator 470.

The first relay 440 receives the final vehicle weight, the first relay 440 is turned on when final vehicle weight is equal or greater than a first ON value 410, the first relay 440 maintains on when the final vehicle weight is between the first ON value 410 and a first OFF value 415, and the first relay 440 is turned off when the final vehicle weight is less than the first OFF value 415. The first relay 440 outputs 1 when the first relay 440 is turned on, and the first relay 440 outputs 0 when the first relay 440 is turned off.

The second relay 450 receives the final vehicle weight, the second relay 450 is turned on when final vehicle weight is equal or greater than a second ON value 420, the second relay 450 maintains on when the final vehicle weight is between the second ON value 420 and a first OFF value 425, and the second relay 450 is turned off when the final vehicle weight is less than the second OFF value 425. The second relay 450 outputs 1 when the second relay 450 is turned on, and the second relay 450 outputs 0 when the second relay 450 is turned off.

The third relay 460 receives the final vehicle weight, the third relay 460 is turned on when final vehicle weight is equal or greater than a third ON value 430, the third relay 450 maintains on when the final vehicle weight is between the third ON value 430 and a first OFF value 435, and the third relay 460 is turned off when the final vehicle weight is less than the third OFF value 435. The third relay 460 outputs 1 when the third relay 460 is turned on, and the third relay 460 outputs 0 when the third relay 460 is turned off.

The first ON value 410 to third ON value 430, and first OFF value 415 to third OFF value 435 are predetermined values for determining the towing level. The first ON value 410 to third ON value 430 may be differently set.

In one form, the second ON value is greater than the first ON value, and the second OFF value is greater than the first OFF value. And the third ON value is greater than the second ON value, and the third OFF value is greater than the second OFF value.

The calculator 470 receives output values of the first relay 440 to the third relay 460, and outputs the towing level by adding the output values.

For example, assumed that the final vehicle weight is 2300 kg, the first ON value 410 is 1500 kg, the first OFF value 415 is 1000 kg, the second ON value 420 is 2000 kg, the second OFF value 425 is 1200 kg, the third ON value 430 is 2500 kg, the third OFF value 435 is 1400 kg. The first relay 440 outputs 1 since the final vehicle weight is greater than the first ON value 410, the second relay 450 outputs 1 since the final vehicle weight is greater than the second ON value 420, and the third relay 460 outputs 1 since the final vehicle weight is greater than the third OFF value and less than the third ON value 430. The calculator 470 may set the towing level as 3 by adding outputs of the first relay 440, the second relay 450 and the third relay 460.

Hereinafter, a method of estimating the vehicle weight will be described in detail with reference to FIG. 5 and to FIG. 6. Constituent elements of the vehicle controller 300 in one form of the present disclosure that is described with reference to FIG. 3 and FIG. 4 may be integrated or subdivided, and constituent elements of the vehicle controller 300 that perform the above-described function regardless of a corresponding name may be constituent elements of the vehicle controller 300. Hereinafter, when describing a method of estimating the vehicle weight in one exemplary form of the present disclosure, in each step, the vehicle controller 300 instead of the constituent elements of the vehicle controller 200 will be described as a subject FIG. 5 is a flowchart illustrating a method of estimating a vehicle weight in one exemplary form of the present disclosure.

Figure 5:
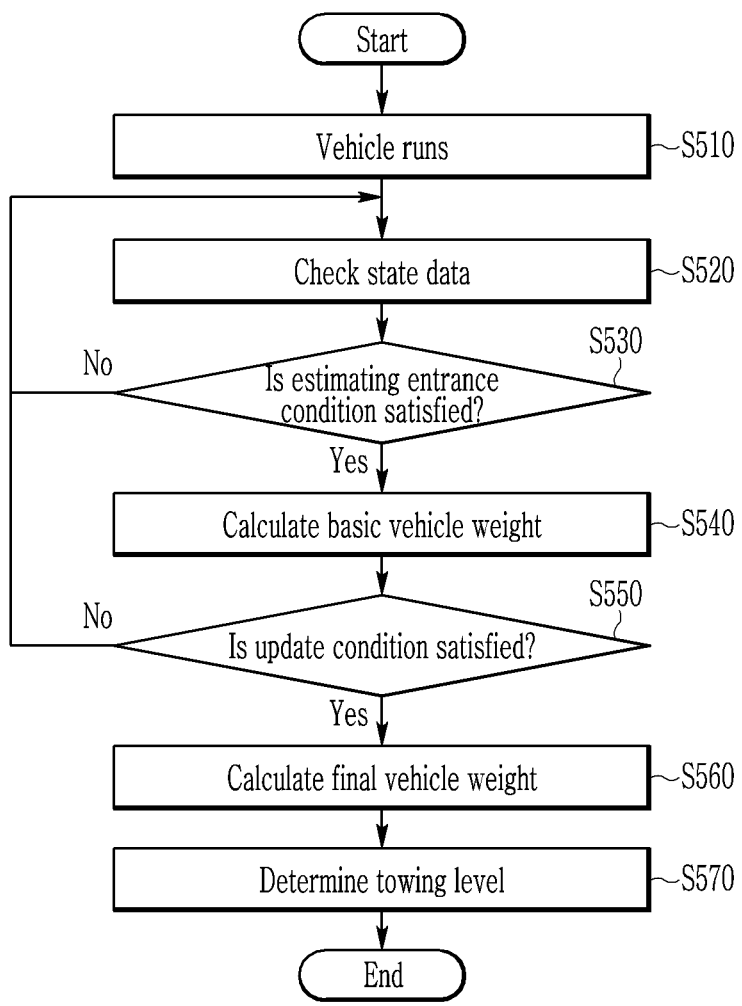
FIG. 5 is a flowchart illustrating a method of estimating a vehicle weight.

Referring to FIG. 5, when the vehicle is turned on by a driver, the vehicle controller 300 controls the engine and/or the drive motor and the vehicle runs at step S510.

The vehicle controller 300 checks the state data for estimating the vehicle weight at step S520. In detail, the data detector 220 detects the state data including the vehicle speed, the position value of the accelerator pedal, the position value of the brake pedal, and the shift-stage. The data detector 220 transmits the state data to the vehicle controller 300.

The acceleration detector 210 detects the longitudinal directional acceleration of the vehicle, and transmits the longitudinal directional acceleration to the vehicle controller 300.

The vehicle controller 300 checks the state data and the longitudinal direction acceleration.

The vehicle controller 300 determines whether the estimating entrance condition is satisfied based on the state data at step S530. In detail, the vehicle controller 300 checks the position value of the acceleration pedal, the position value of the brake pedal and the shift-stage included in the state data. The vehicle controller 300 calculates a braking amount in accordance with the brake pedal, and calculates a road slope in accordance with the longitudinal direction acceleration.

The vehicle controller 300 determines whether the position value of the acceleration pedal is within a first predetermined range. The vehicle controller 300 the braking amount is less than a predetermined braking amount when the position value of the acceleration pedal is within the first predetermined range. The vehicle controller 300 determines whether the road slope is within a second predetermined range when braking amount is less than a predetermined braking amount.

The vehicle controller 300 determines whether the shift-stage corresponds to a predetermined shift-stage when road slope is within the second predetermined range. The vehicle controller 300 determines whether the shift class corresponds to a predetermined class when the shift-stage corresponds to the predetermined shift-stage. The vehicle controller 300 determines whether the control phase of the engine clutch 120 corresponds to a predetermined control value when the shift class corresponds to the predetermined class. The vehicle controller 300 determines that the estimating entrance condition is satisfied when the control phase of the engine clutch 120 corresponds to the predetermined control value.

Here, the first predetermined range, the predetermined braking amount, the second predetermined range, the predetermined shift-stage, the predetermined class, and the predetermined control value are predetermined for determining the estimating entrance condition. The first predetermined range, the predetermined braking amount, the second predetermined range, the predetermined shift-stage, the predetermined class and the predetermined control value may be set by a worker, or by a predetermined algorithm (e.g., program and probability model).

The vehicle controller 300 proceeds to step S520 when the estimating entrance condition is not satisfied. That is, the process by the vehicle controller 300 returns to the step S520 when the position value of the acceleration pedal is not within the first predetermined range, the braking amount is greater than the predetermined braking amount, the road slope is not within the second predetermined range, the shift-stage does not correspond to the predetermined shift-stage, the shift class does not correspond to the predetermined class, or the control phase of the engine clutch 120 does not correspond to the predetermined control value.

The vehicle controller 300 calculates the basic vehicle weight by using the engine torque, the motor torque and the longitudinal direction acceleration when the estimating entrance condition is satisfied at step S540. More particularly, the vehicle controller 300 calculates the basic vehicle weight by using the engine torque, the motor torque, the longitudinal direction acceleration, tire dynamic radius, the shift efficiency, the clutch coefficient according to the state of the engine clutch 120, the engine friction torque, the pulley ratio between the engine 110 and the HSG 115, the vehicle speed, the generation torque of the HSG 115 and the driving load coefficient. The vehicle controller 300 calculates the basic vehicle weight from following equation 1.

[equation 1]

$$m = \frac{\int_{t0}^{t1} \left[ \frac{\eta_{TM}}{r_{tire}} \left( \delta_{E/C}(\tau_{eng}^{led} - \tau_{eng}^{fr} + \gamma t_{HSG}) + \tau_{Mot}^{BeAj} \right) - (f_0 + f_1 v + f_2 v^2) \right] dt}{\int_{t0}^{t1} G(t) dt}$$

Herein, the m denotes the basic vehicle weight, the $\eta_{TM}$ denotes the shift efficiency, the $r_{tire}$ denotes the dynamic radius of the tire, the $\delta_{EC}$ denotes the clutch coefficient according to the state of the engine clutch 120, the $\tau_{eng}^{led}$ denotes the engine torque, the $\Sigma_{eng}^{fr}$ denotes the engine friction torque, the $\gamma$ denotes the pulley ratio between the engine 110 and the HSG 115, the $\tau_{HSG}$ denotes the generation torque of the HSG 115, the $\tau_{Max}^{BeAj}$, denotes the motor torque, the $f_0$, $f_1$, $f_2$ denote the driving load coefficients, the v denotes the vehicle speed and the G(t) denotes the longitudinal direction acceleration.

The vehicle controller 300 determines whether the update condition is satisfied based on the calculation time, the vehicle speed variation and a change of gear shifting at step S550. Particularly, the vehicle controller 300 determines whether the calculation time is equal or greater than a predetermined time. The vehicle controller 300 determines whether the vehicle speed variation is equal or greater than a predetermined variation when the calculation time is equal or greater than the predetermined time. The vehicle controller 300 determines whether the gear shifting is changed when the vehicle speed variation is equal or greater than the predetermined variation. And the vehicle controller 300 determines that the update condition is satisfied when the gear shift is not changed in the transmission 150.

At this time, the predetermined time and the predetermined variation are predetermined for determining the updated condition. The predetermined time and the predetermined variation may be set by a worker, or by a predetermined algorithm (e.g., program and probability model).

The vehicle controller 300 proceeds to step S520 when the update condition is not satisfied. That is, the process of the vehicle controller 300 returns to the step S520 when the calculation time is less than the predetermined time, the vehicle speed variation is less than the predetermined variation, or the gear shift is not changed in the transmission 150.

The vehicle controller 300 calculates the final vehicle weight based on the basic vehicle weight and the predetermined weight when the update condition is satisfied at step S560. The method of estimating the final vehicle weight will be described in detail later.

The vehicle controller 300 determines the towing level based on the final vehicle weight at step S570. That is, the vehicle controller 300 determines the towing level for checking the weight of the trailer mounted in the vehicle based on the final vehicle weight. Then, the vehicle controller 300 may manage the SOC of the battery based on the towing level.

Figure 6:
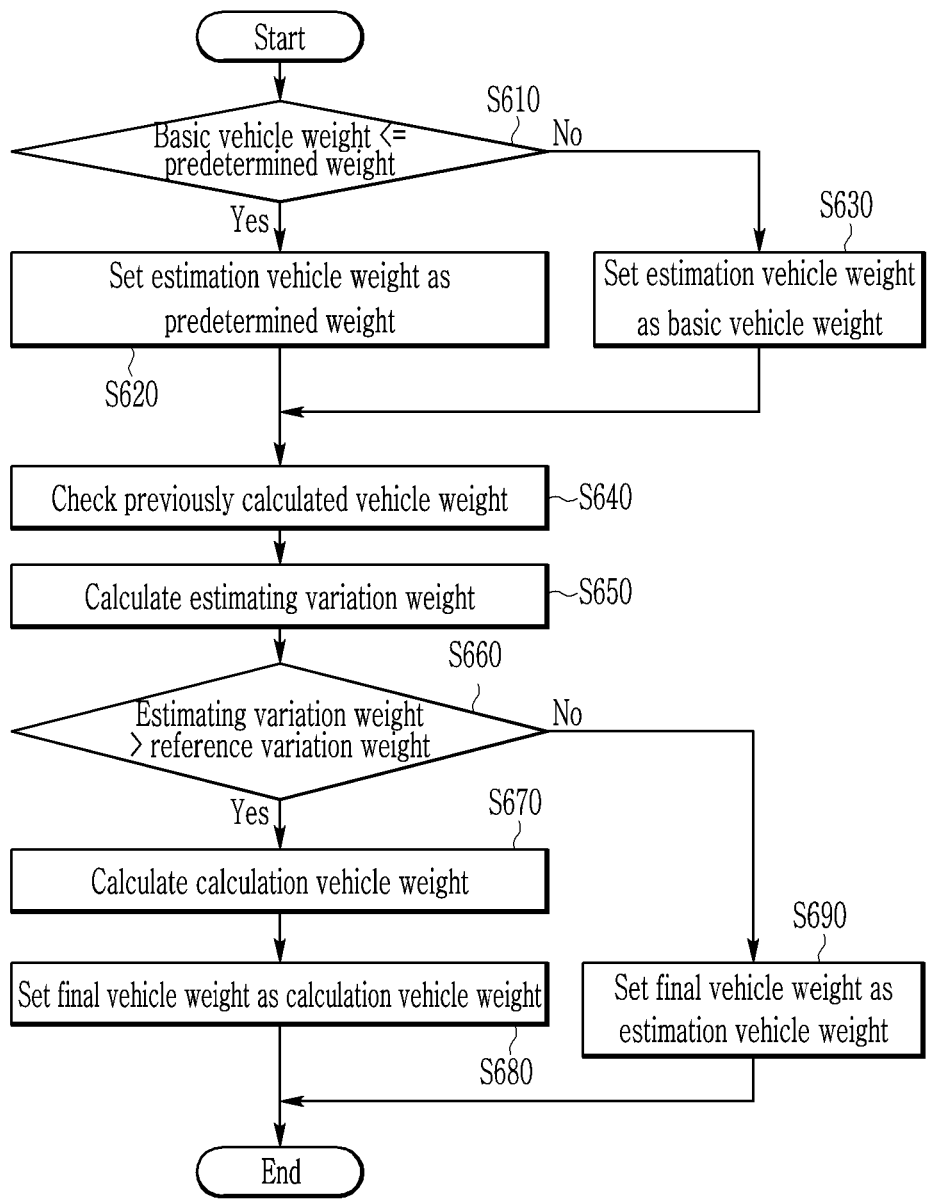
FIG. 6 is a flowchart illustrating a method of estimating a final vehicle weight.

FIG. 6 is a flowchart illustrating a method of estimating a final vehicle weight in one exemplary form of the present disclosure.

Referring to FIG. 6, the vehicle controller 300 determines whether the basic vehicle weight is equal or less than the predetermined weight at step S610.

The vehicle controller 300 sets the estimation vehicle weight as the predetermined weight when the basic vehicle weight is equal or less than the predetermined weight at step S620. Since the basic vehicle weight calculated based on the engine torque, the motor torque and the longitudinal direction acceleration is not less than the predetermined weight of the total vehicle weight, error can be reduced or prevented by determining that the basic vehicle weight is equal or less than the predetermined weight. Thus, when the basic vehicle weight is equal or less than the predetermined weight, the vehicle controller determines that error occurs and sets the estimation vehicle weight as the predetermined weight in order to compensate the error.

The vehicle controller 300 sets the estimation vehicle weight as the basic vehicle weight when the basic vehicle weight is greater than the predetermined weight at step S630.

The vehicle controller 300 checks the previously calculated vehicle weight before the basic vehicle weight is calculated at step S640.

The vehicle controller 300 calculates the estimating variation weight by using the previously calculated vehicle weight and the estimation vehicle weight at step S650. In one form, the vehicle controller 300 may calculate the estimating variation weight by subtracting the estimation vehicle weight from the previously calculated vehicle weight.

The vehicle controller 300 determines whether the estimating variation weight is greater than a reference variation weight at step S660. That is, the vehicle controller 300 checks the reference variation weight in which the vehicle weight is maximally varied during running, and determines whether the estimating variation weight is greater than the reference variation weight.

The vehicle controller 300 calculates a calculation vehicle weight by using the reference variation weight and the previously calculated vehicle weight when the estimating variation weight is greater than the reference variation weight at step S670. In one form, the vehicle controller 300 may calculate the calculation vehicle weight by adding the reference variation weight and the previously calculated vehicle weigh.

The vehicle controller 300 sets the final vehicle weight as the calculation vehicle weight at step S680.

The vehicle controller 300 sets the final vehicle weight as the estimation vehicle weight when the estimating variation weight is equal or less than the reference variation weight at step S690.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

110: engine
130: drive motor
140: battery
150: transmission
210: acceleration detector
220: data detector
300: vehicle controller
310: condition checking unit
320: generating unit
330: update checking unit
340: estimating unit
350: level determiner

What is claimed is:

1. An apparatus of estimating a vehicle weight, the apparatus comprising:
an acceleration detector configured to detect a longitudinal direction acceleration of the vehicle;
a data detector configured to detect state data for estimating the vehicle weight; and
a vehicle controller configured to calculate a basic vehicle weight based on an engine torque, a motor torque, and the longitudinal direction acceleration detected by the acceleration detector, and configured to estimate a final vehicle weight based on the basic vehicle weight and a predetermined weight when the vehicle controller determines that an estimating entrance condition is satisfied based on the state data, wherein the vehicle controller includes:
  a condition checking unit configured to determine whether the estimating entrance condition is satisfied based on the state data, and to generate an estimating confirmation signal when the estimating entrance condition is satisfied;
  a generating unit configured to calculate the basic vehicle weight based on the engine torque, the motor torque, and the longitudinal direction acceleration when the estimating confirmation signal is transmitted from the condition checking unit;
  an update checking unit configured to determine whether an update condition is satisfied based on a calculation time, a vehicle speed variation, and a change of gear shifting, and to generate an update confirmation signal when the update condition is satisfied; and
  an estimating unit configured to calculate the final vehicle weight based on the basic vehicle weight and the predetermined weight when the update confirmation signal is transmitted from the update checking unit, and
wherein the condition checking unit is configured to:
  receive a position value of an acceleration pedal, a position value of a brake pedal, a shift-stage from the data detector;
  calculate a braking amount based on the position value of the brake pedal;
  calculate a road slope based on the longitudinal direction acceleration; and
  determine whether the estimating entrance condition is satisfied based on the position value of acceleration pedal, the braking amount, the road slope, a shift class, and a control phase of an engine clutch.

2. The apparatus of claim 1, wherein the generating unit is configured to calculate the basic vehicle weight based on the engine torque, the motor torque, the longitudinal direction acceleration, tire dynamic radius, a shift efficiency, a clutch coefficient with respect to a state of the engine clutch, an engine friction torque, a pulley ratio between the engine and a integrated starter-generator, a vehicle speed, a generation torque of the integrated starter-generator, and a driving load coefficient.

3. The apparatus of claim 1, wherein the basic vehicle weight is calculated, by the generating unit, as $$m = \frac{\int_{t0}^{t1}\left[\frac{\eta_{TM}}{r_{tire}}\left(\delta_{E/C}(\tau_{eng}^{lad} - \tau_{eng}^{fr} + \gamma t_{HSG}) + \tau_{Mot}^{BeAj}\right) - (f_0 + f_1 v + f_2 v^2)\right]dt}{\int_{t0}^{t1} G(t)dt},$$

where: the m is the basic vehicle weight, the $\eta_{TM}$ is the shift efficiency, the $r_{tire}$ is the dynamic radius of the tire, the $\delta_{EC}$ is the clutch coefficient according to the state of the engine clutch, the $\tau_{eng}^{led}$ is the engine torque, the $\Sigma_{eng}^{fr}$ is the engine friction torque, the $\gamma$ is the pulley ratio between the engine and the integrated starter-generator, the $\tau_{HSG}$ is the generation torque of the integrated starter-generator, the $\tau_{Max}^{BeAj}$ is the motor torque, the $f_0, f_1, f_2$ are the driving load coefficients, the v is the vehicle speed and the G(t) is the longitudinal direction acceleration.

4. The apparatus of claim 1, wherein
the estimating unit is configured to determine whether the basic vehicle weight is equal to or less than the predetermined weight, and to set the final vehicle weight as the predetermined weight when the basic vehicle weight is equal to or less than the predetermined weight.

5. The apparatus of claim 1, wherein
the estimating unit is configured to check an estimating variation weight which shows a difference between a previously calculated vehicle weight and the current basic vehicle weight when the estimating variation weight is greater than a reference variation weight, and to calculate the final vehicle weight based on the previously calculated vehicle weight and the reference variation weight.

6. The apparatus of claim 1, wherein
the vehicle controller further includes a level determiner configured to determine a towing level based on the final vehicle weight.

7. The apparatus of claim 6, wherein
the level determiner is configured to determine the towing level based on the final vehicle weight through a plurality of relay.

8. A method of estimating a vehicle weight, the method comprising:
  determining, by a condition checking unit, whether an estimating entrance condition based on state data;
  calculating, by a generating unit, a basic vehicle weight based on an engine torque, a motor torque, and a longitudinal direction acceleration when the estimating entrance condition is satisfied;
  determining, by an update checking unit, whether an update condition is satisfied based on a calculation time, vehicle speed variation, and a change of gear shifting;
  calculating, by an estimating unit, a final vehicle weight based on the basic vehicle weight and a predetermined weight when the update condition is satisfied; and
  determining, by a level determiner, a towing level based on the final vehicle weight,
wherein the estimating entrance condition is satisfied when a position value of an acceleration pedal is within a first predetermined range, a braking amount dependent on a position value of a brake pedal is within a predetermined braking amount, a road slope dependent on the longitudinal direction acceleration is within a second predetermined range, a shift-stage corresponds a predetermined shift-stage, a shift class corresponds a predetermined class, and a control phase of an engine clutch corresponds a predetermined control.

9. The method of claim 8, wherein
the basic vehicle weight is calculated based on
the engine torque, the motor torque, the longitudinal direction acceleration, tire dynamic radius of a tire, a shift efficiency, a clutch coefficient according to a state of the engine clutch, an engine friction torque, a pulley ratio between the engine and an integrated starter-generator, a vehicle speed, a generation torque of the integrated starter-generator, and a driving load coefficient.

10. The method of claim 8, wherein
the basic vehicle weight is calculated as $$m = \frac{\int_{t0}^{t1}\left[\frac{\eta_{TM}}{r_{tire}}\left(\delta_{E/C}(\tau_{eng}^{lad} - \tau_{eng}^{fr} + \gamma t_{HSG}) + \tau_{Mot}^{BeAj}\right) - (f_0 + f_1 v + f_2 v^2)\right]dt}{\int_{t0}^{t1} G(t)dt},$$

where: the m is the basic vehicle weight, the $\eta_{TM}$ is the shift efficiency, the $r_{tire}$ is the dynamic radius of the tire, the $\delta_{EC}$ is the clutch coefficient according to the state of the engine clutch, the $\tau_{eng}^{led}$ is the engine torque, the $\Sigma_{eng}^{fr}$ is the engine friction torque, the $\gamma$ is the pulley ratio between the engine and the integrated starter-generator, the $\tau_{HSG}$ is the generation torque of the integrated starter-generator, the $\tau_{Max}^{BeAj}$ is the motor torque, the $f_0$, $f_1$, $f_2$ are the driving load coefficients, the v is the vehicle speed and the G(t) is the longitudinal direction acceleration.

11. The method of claim 8, wherein
the update condition is satisfied when the calculation time is equal to or greater than a predetermined time, the vehicle speed variation is equal to or greater than a predetermined variation, and a gear shifting is not changed in a transmission.

12. The method of claim 8, wherein the calculating of the final vehicle weight includes:
determining whether the basic vehicle weight is equal to or less than the predetermined weight when the update condition is satisfied; and
setting the predetermined weight as the final vehicle weight when the basic vehicle weight is equal to or less than the predetermined weight.

13. The method of claim 12, further comprising:
setting the basic vehicle weight as the final vehicle weight when the basic vehicle weight is greater than the predetermined weight after determining that the basic vehicle weight is equal or less than the predetermined weight.

14. The method of claim 8, wherein
the calculating of the final vehicle weight includes:
checking the estimating variation weight which shows a difference between a previously calculated vehicle weight and the current basic vehicle weight when the update condition is satisfied;
determining whether the estimating variation weight is greater than a reference variation weight;
calculating a calculated vehicle weight by adding the previously calculated vehicle weight and the reference variation weight when the estimating variation weight is greater than the reference variation weight; and
setting the calculated vehicle weight as the final vehicle weight.

15. The method of claim 14, wherein
setting the basic vehicle weight as the final vehicle weight when the estimating variation weight is equal or less than the reference variation weight after determining that the estimating variation weight is greater than the reference variation weight.

16. The method of claim 8, wherein
the calculation of the final vehicle weight includes:
determining whether the basic vehicle weight is equal to or less than the predetermined weight when the update condition is satisfied;
setting the predetermined weight as the estimated vehicle weight when the basic vehicle weight is equal to or less than the predetermined weight;
checking an estimating variation weight which shows a difference between a previously calculated vehicle weight and the current basic vehicle weight;
determining whether the estimating variation weight is greater than a reference variation weight;
calculating a calculated vehicle weight based on the previously calculated vehicle weight and the reference variation weight when the estimating variation weight is greater than the reference variation weight; and
setting the calculated vehicle weight as the final vehicle weight.

* * * * *